(12) United States Patent
Tsubaki et al.

(10) Patent No.: US 12,084,122 B2
(45) Date of Patent: Sep. 10, 2024

(54) STEERING APPARATUS FOR VEHICLES

(71) Applicant: NSK LTD., Tokyo (JP)

(72) Inventors: Takahiro Tsubaki, Maebashi (JP); Hiroyasu Kumagai, Fujisawa (JP)

(73) Assignee: NSK LTD., Tokyo (JP)

( * ) Notice: Subject to any disclaimer, the term of this patent is extended or adjusted under 35 U.S.C. 154(b) by 608 days.

(21) Appl. No.: 17/419,976

(22) PCT Filed: Dec. 13, 2019

(86) PCT No.: PCT/JP2019/048967
§ 371 (c)(1),
(2) Date: Jun. 30, 2021

(87) PCT Pub. No.: WO2020/145036
PCT Pub. Date: Jul. 16, 2020

(65) Prior Publication Data
US 2022/0063710 A1 Mar. 3, 2022

(30) Foreign Application Priority Data
Jan. 11, 2019 (JP) ................................. 2019-003715

(51) Int. Cl.
B62D 5/04 (2006.01)
B62D 6/00 (2006.01)

(52) U.S. Cl.
CPC ......... B62D 5/0409 (2013.01); B62D 5/0421 (2013.01); B62D 5/046 (2013.01); B62D 6/00 (2013.01)

(58) Field of Classification Search
CPC .... B62D 5/0409; B62D 5/0421; B62D 5/046; B62D 6/00
(Continued)

(56) References Cited

U.S. PATENT DOCUMENTS

2002/0117348 A1* 8/2002 Shimizu ............... B62D 5/0406
180/443
2008/0035411 A1* 2/2008 Yamashita ............. B62D 5/049
180/443
(Continued)

FOREIGN PATENT DOCUMENTS

JP 5208894 B2 6/2013
WO 2018/084190 A1 5/2018
(Continued)

OTHER PUBLICATIONS

International Search Report for PCT/JP2019/048967 dated Feb. 18, 2020.

Primary Examiner — Mahmoud S Ismail
(74) Attorney, Agent, or Firm — Sughrue Mion, PLLC

(57) ABSTRACT

A steering apparatus for vehicles that assists and controls a steering system includes a torsional angle control section that calculates a motor current command value to make the torsional angle follow a target torsional angle; the torsional angle control section includes a steering angle disturbance compensating section that calculates a first compensation motor current command value by performing filter processing to the detected steering angle, and the torsional angle control section performs compensation by the first compensation motor current command value in calculation of the motor current command value.

4 Claims, 17 Drawing Sheets

(58) Field of Classification Search
USPC .......................................................... 701/41
See application file for complete search history.

(56) References Cited

U.S. PATENT DOCUMENTS

2017/0120949 A1* 5/2017 Sakamaki ............... B62D 6/008
2019/0225261 A1* 7/2019 Kodera ................ B62D 5/0463

FOREIGN PATENT DOCUMENTS

| WO | 2018/147371 A1 | 8/2018 |
| WO | 2018/168891 A1 | 9/2018 |

* cited by examiner

PRIOR ART

STEERING APPARATUS FOR VEHICLES

CROSS REFERENCE TO RELATED APPLICATIONS

This application is a National Stage of International Application No. PCT/JP2019/048967 filed Dec. 13, 2019, claiming priority based on Japanese Patent Application No. 2019-003715 filed Jan. 11, 2019.

TECHNICAL FIELD

The present invention relates to a high-performance steering apparatus for vehicles that obtains a desired steering torque on the basis of a torsional angle of a torsion bar or the like, and maintains the desired steering torque without being affected by a road surface state and aging-changes of mechanism system characteristics.

BACKGROUND ART

An electric power steering apparatus (EPS) being one of steering apparatuses for vehicles provides a steering system of a vehicle with an assist torque (a steering assist torque) by means of a rotational torque of a motor, and applies a driving force of the motor which is controlled by using an electric power supplied from an inverter as the assist torque to a steering shaft or a rack shaft by means of a transmission mechanism including a reduction mechanism. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through a reduction mechanism 3, universal joints 4a and 4b, a rack-and-pinion mechanism 5, and tie rods 6a and 6b, further via hub units 7a and 7b. In addition, a torque sensor 10 for detecting a steering torque Ts of the steering wheel 1 and a steering angle sensor 14 for detecting a steering angle θh are provided in the column shaft 2 having a torsion bar, and a motor 20 for assisting a steering force of the steering wheel 1 is connected to the column shaft 2 through the reduction mechanism 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) based on the steering torque Ts detected by the torque sensor 10 and a vehicle speed Vs detected by a vehicle speed sensor 12, and controls a current supplied to the motor 20 for the EPS by means of a voltage control command value Vref obtained by performing compensation or the like to the current command value.

A controller area network (CAN) 40 exchanging various information of a vehicle is connected to the control unit 30, and it is possible to receive the vehicle speed Vs from the CAN 40. Further, it is also possible to connect a non-CAN 41 exchanging a communication, analog/digital signals, a radio wave or the like except for the CAN 40 to the control unit 30.

The control unit 30 mainly comprises a central processing unit (CPU) (including a micro controller unit (MCU), a micro processor unit (MPU) and so on), and general functions performed by programs within the CPU are shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31. The current command value calculating section 31 calculates a current command value Iref1 that is a control target value of a current supplied to the motor 20 based on the inputted steering torque Ts and vehicle speed Vs and by using an assist map or the like. The current command value Iref1 is inputted into a current limiting section 33 through an adding section 32A. A current command value Irefm whose maximum current is limited is inputted into a subtracting section 32B, and a deviation I (=Irefm−Im) between the current command value Irefm and a motor current value Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37 serving as a driving section. The motor current value Im of the motor 20 is detected by a motor current detector 38 and is fed back to the subtracting section 32B.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 343 and an inertia 342 at an adding section 344, further adds a convergence 341 to the added result at an adding section 345, and then outputs the added result at the adding section 345 as the compensation signal CM.

Thus, in assist control by a conventional electric power steering apparatus, a steering torque applied by a manual input of a driver is detected as a torsional torque of a torsion bar by a torque sensor, and a motor current is mainly controlled as an assist current depending on the detected steering torque. However, in the case of performing control by this method, different steering torques can be generated depending on a steering angle due to a difference of a road surface state (for example, a cant of the road surface). Variations of a motor output characteristic due to long-term use can also affect the steering torque.

In order to solve the above problems, for example, an electric power steering apparatus shown in the publication of Japanese Patent No. 5208894 B2 (Patent Document 1) has been proposed. The electric power steering apparatus of Patent Document 1 sets a target value of the steering torque based on a relation (a steering reaction characteristic map) between the steering angle, which is determined based on a relation between the steering angle or the steering torque and an amount of response, and the steering torque in order to apply an appropriate steering torque based on a tactile characteristic of a driver.

THE LIST OF PRIOR ART DOCUMENTS

Patent Documents

Patent Document 1: Japanese Patent No. 5208894 B2

SUMMARY OF THE INVENTION

Problems to be Solved by the Invention

However, in the electric power steering apparatus of Patent Document 1, it is necessary to obtain the steering reaction characteristic map preliminarily. Further, since the apparatus performs control based on a deviation between a target value of the steering torque and a detected steering torque, an influence to the steering torque may remain.

The present invention has been developed in view of the above-described circumstances, and an object of the present invention is to provide a steering apparatus for vehicles that easily obtains equivalent steering torques to a steering angle or the like without being affected by a road surface state and aging-changes of mechanism characteristics of a steering system.

Means for Solving the Problems

The present invention relates to a steering apparatus for vehicles that comprises at least a torsion bar having an arbitrary spring constant, a sensor for detecting a torsional angle of the torsion bar, and a sensor for detecting a steering angle of a steering wheel, drives and controls a motor, and assists and controls a steering system, and the above-described object of the present invention is achieved by that comprising: a torsional angle control section that calculates a motor current command value to make the torsional angle follow a target torsional angle; wherein the torsional angle control section comprises a steering angle disturbance compensating section that calculates a first compensation motor current command value by performing filter processing to the detected steering angle, and the torsional angle control section performs compensation by the first compensation motor current command value in calculation of the motor current command value; and wherein the steering apparatus for vehicles drives and controls the motor based on the motor current command value.

Further, the above-described object of the present invention is efficiently achieved by that wherein the torsional angle control section further comprises a torsional angle feedback compensating section that calculates a target torsional angular velocity by a deviation between the target torsional angle and the torsional angle, a torsional angular velocity calculating section that calculates a torsional angular velocity by the torsional angle, and a velocity control section that calculates a basic motor current command value based on the target torsional angular velocity and the torsional angular velocity, and the torsional angle control section calculates the motor current command value by compensating the basic motor current command value by the first compensation motor current command value; or wherein the torsional angle control section further comprises an output limiting section that limits upper and lower limit values of the motor current command value; or further comprising a target steering torque generating section that generates a target steering torque, and a converting section that converts the target steering torque into the target torsional angle used at the torsional angle control section; or wherein the target steering torque generating section comprises a basic map section that obtains a first torque signal in accordance with the steering angle and a vehicle speed by using a basic map, a damper calculating section that obtains a second torque signal based on angular velocity information by using a damper gain map being vehicle speed sensitive, and a hysteresis correcting section that obtains a third torque signal by performing hysteresis correction by using a steering state and the steering angle, and the target steering torque generating section calculates the target steering torque by at least one of the first torque signal, the second torque signal, or the third torque signal; or wherein the basic map and a characteristic of the hysteresis correcting section are vehicle speed sensitive; or wherein the target steering torque generating section further comprises a phase compensating section that performs phase compensation in a front stage or a rear stage of the basic map section, and the target steering torque generating section obtains the first torque signal in accordance with the steering angle and the vehicle speed via the basic map section and the phase compensating section.

Effects of the Invention

The steering apparatus for vehicles of the present invention operates so that the torsional angle follows the target torsional angle, obtains a desired steering torque, and can supply an appropriate steering torque based on steering feeling of a driver.

Further, followability to the target torsional angle in abrupt steering can be more improved by the steering angle disturbance compensating section.

MODE FOR CARRYING OUT THE INVENTION

The present invention is a steering apparatus for vehicles to obtain an equivalent steering torque corresponding to a steering angle or the like without being affecting a road surface state, and obtains a desired steering torque by performing control so that a torsional angle of a torsion bar or the like follows a value depending on the steering angle or the like.

Hereinafter, embodiments of the present invention will be described with reference to the accompanying drawings.

Figure 3:
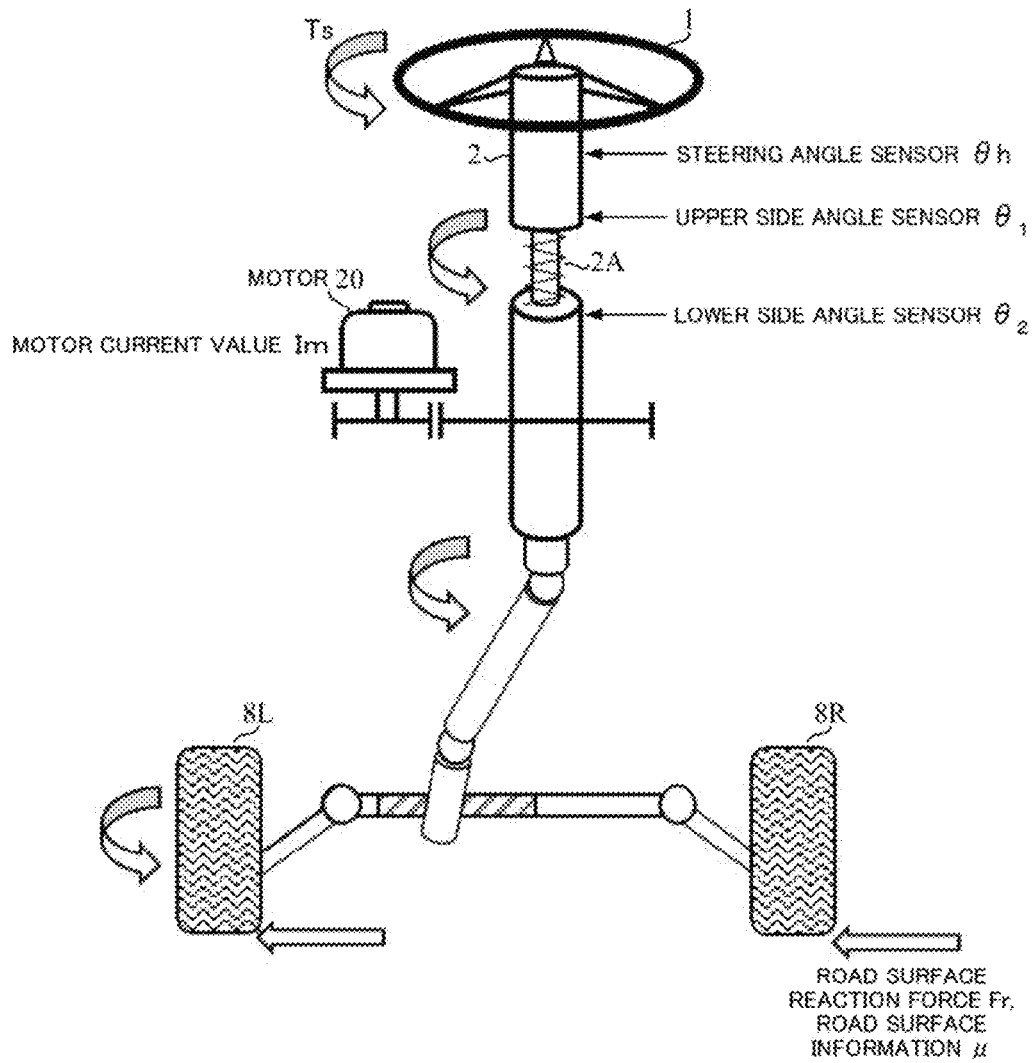
FIG. 3 is a structural diagram showing an installation example of an EPS steering system and various sensors.

First, an installation example of various sensors that detect information related to an electric power steering apparatus being one of steering apparatuses for vehicle of the present invention, will be described. FIG. 3 is a diagram showing an installation example of an EPS steering system and various sensors. A torsion bar 2A is provided in a column shaft 2. Road surface reaction force Fr and road surface information μ operate on steered wheels 8L and 8R. An upper side angle sensor is disposed on a steering wheel side of the column shaft 2 above the torsion bar 2A, and a lower side angle sensor is disposed on a steered wheel side of the column shaft 2 below the torsion bar 2A. The upper side angle sensor detects a steering wheel angle $\theta_1$, and the lower side angle sensor detects a column angle $\theta_2$. A steering angle θh is detected by a steering angle sensor disposed on an upper portion of the column shaft 2. A torsional angle Δθ of the torsion bar and a torsion bar torque Tt can be calculated by the following expressions 1 and 2 from a deviation between the steering wheel angle $\theta_1$ and the column angle $\theta_2$. In the expression 2, Kt is a spring constant of the torsion bar 2A.

$\theta_2 - \theta_1 = \Delta\theta$     [Expression 1]

$-Kt \cdot \Delta\theta = Tt$     [Expression 2]

The torsion bar torque Tt can be also detected by using, for example, a torque sensor disclosed in Japanese Unexamined Patent Publication No. 2008-216172 A. In the present embodiment, the torsion bar torque Tt is treated also as a steering torque Ts.

Next, a configuration example of the present invention will be described.

Figure 4:
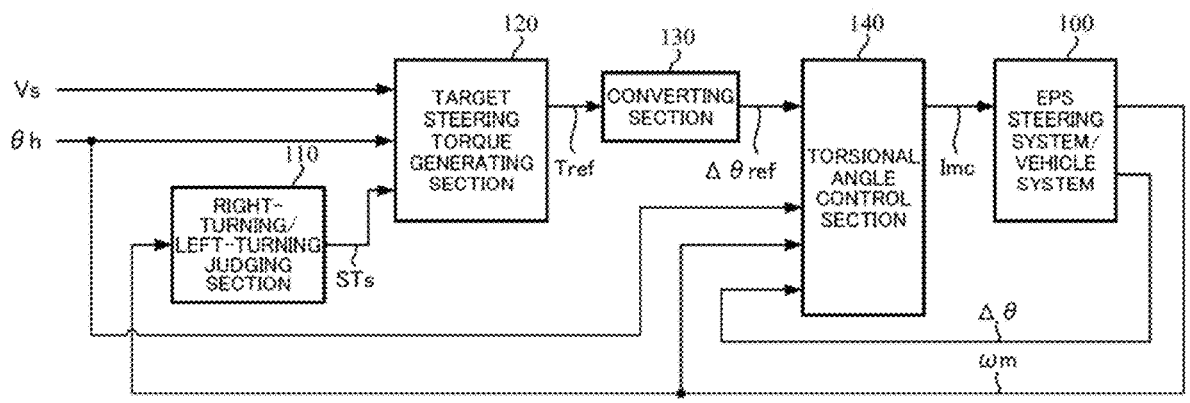
FIG. 4 is a block diagram showing a configuration example (a first embodiment) of the present invention.

FIG. 4 is a block diagram showing a configuration example (a first embodiment) of the present invention, and steering of a driver is assisted and controlled by a motor in an EPS steering system/vehicle system 100. A vehicle speed Vs and a steering state STs that is outputted from a right-turning/left-turning judging section 110 and indicates right-turning or left-turning, are inputted into a target steering torque generating section 120 that outputs a target steering torque Tref, in addition to the steering angle θh. The target steering torque Tref is converted into a target torsional angle Δθref at a converting section 130, and the target torsional angle Δθref is inputted into a torsional angle control section 140 with the torsional angle Δθ of the torsion bar 2A, a motor angular velocity ωm and the steering angle θh. The torsional angle control section 140 calculates a motor current command value Imc so that the torsional angle Δθ becomes the target torsional angle Δθref. The motor of the EPS is driven in accordance with the motor current command value Imc.

The right-turning/left-turning judging section 110 judges whether steering is right-turning or left-turning based on the motor angular velocity ωm, and outputs the judgment result as the steering state STs. That is, when the motor angular velocity ωm is a positive value, the right-turning/left-turning judging section 110 judges the steering "right-turning", and when the motor angular velocity ωm is a negative value, the right-turning/left-turning judging section 110 judges the steering "left-turning". Instead of the motor angular velocity ωm, an angular velocity calculated by velocity calculation with respect to the steering angle θh, the steering wheel angle $\theta_1$ or the column angle $\theta_2$, may be used.

Figure 5:
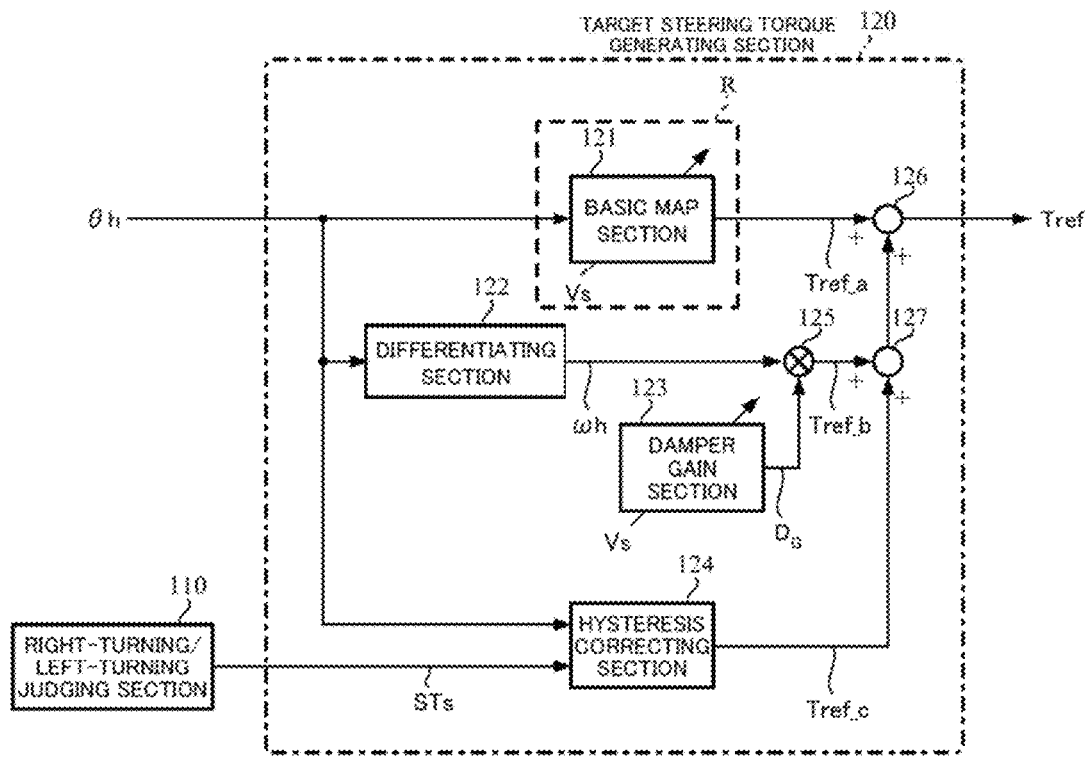
FIG. 5 is a block diagram showing a configuration example of a target steering torque generating section.

FIG. 5 shows a configuration example of the target steering torque generating section 120. The target steering torque generating section 120 comprises a basic map section 121, a differentiating section 122, a damper gain section 123, a hysteresis correcting section 124, a multiplying section 125 and adding sections 126 and 127. The steering angle θh is inputted into the basic map section 121, the differentiating section 122 and the hysteresis correcting section 124. The steering state STs outputted from the right-turning/left-turning judging section 110 is inputted into the hysteresis correcting section 124.

Figure 6A:
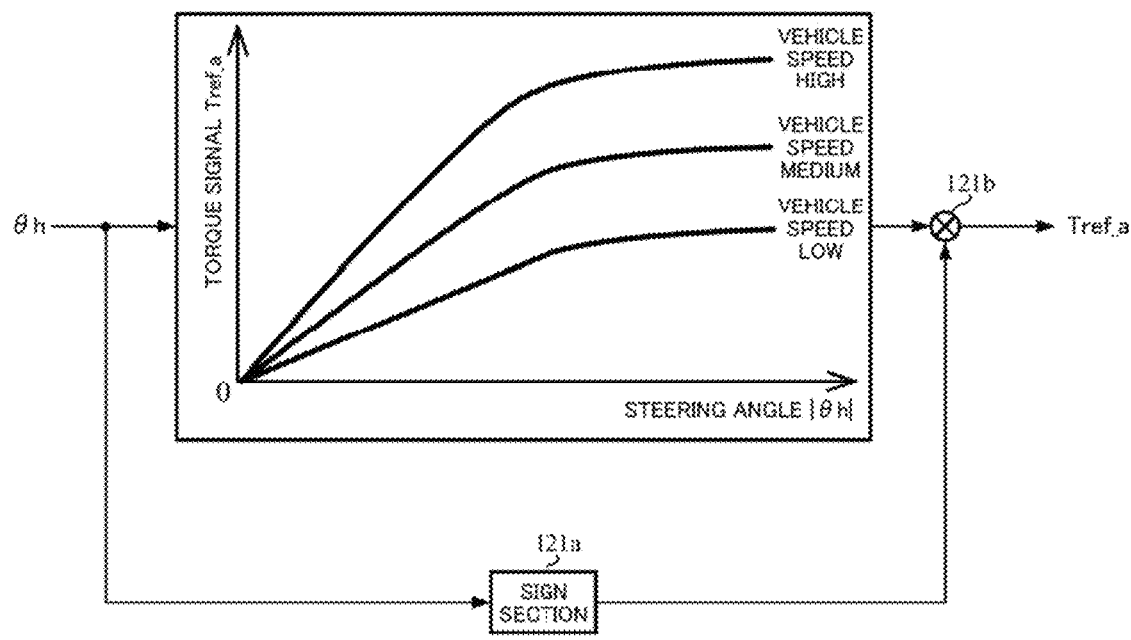
FIGS. 6A and 6B are diagrams showing a characteristic example of a basic map.
Figure 6B:
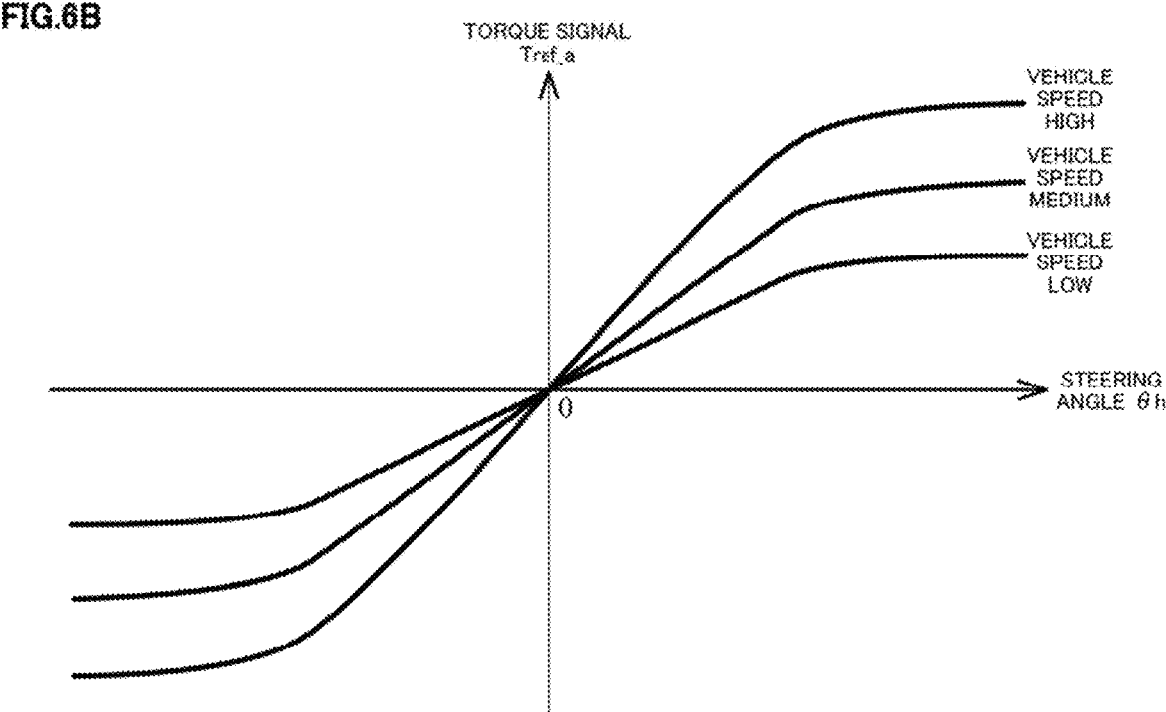

The basic map section 121 has a basic map, and outputs a torque signal (a first torque signal) Tref_a having the vehicle speed Vs as a parameter by using the basic map. The basic map has been adjusted by tuning. For example, as shown in FIG. 6A, the torque signal Tref_a increases as a magnitude (an absolute value) |θh| of the steering angle θh increases, and increases also as the vehicle speed Vs increases. FIG. 6A shows a configuration where a sign section 121a outputs a sign (+1, −1) of the steering angle θh to a multiplying section 121b, a magnitude of the torque signal Tref_a is obtained from the magnitude of the steering angle θh by using a map, the magnitude of the torque signal Tref_a is multiplied by the sign of the steering angle θh, and the torque signal Tref_a is obtained. On the other hand, as shown in FIG. 6B, the map may be configured depending on a positive and a negative steering angles θh. In this case, the mode of variation may be changed depending on whether the steering angle θh is positive or negative. Although the basic map shown in FIGS. 6A and 6B is vehicle speed sensitive, the basic map may not be vehicle speed sensitive.

The differentiating section 122 calculates a steering angular velocity ωh being angular velocity information by differentiating the steering angle θh, and the steering angular velocity ωh is inputted into the multiplying section 125.

Figure 7:
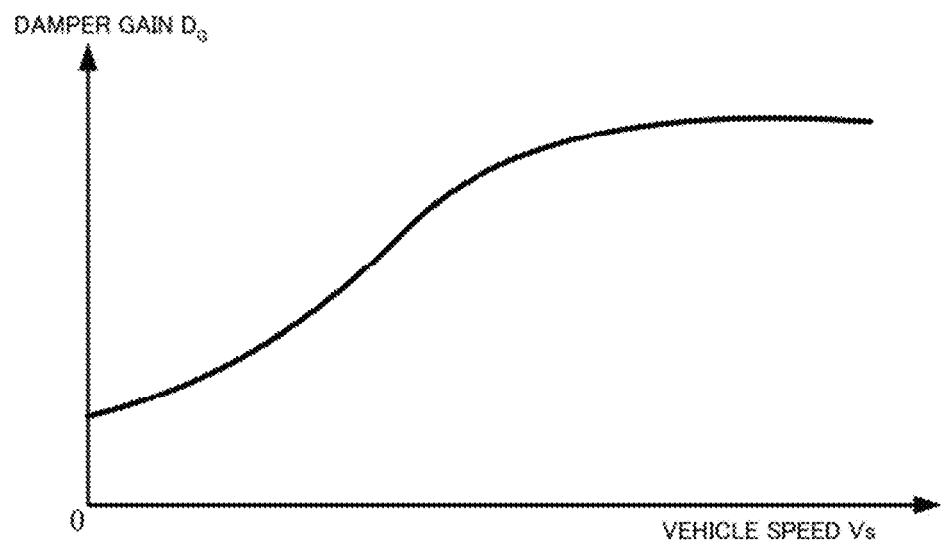
FIG. 7 is a diagram showing a characteristic example of a damper gain map.

The damper gain section 123 outputs a damper gain $D_G$ by which the steering angular velocity ωh is multiplied. The steering angular velocity ωh that has been multiplied by the damper gain $D_G$ at the multiplying section 125, is inputted into the adding section 127 as a torque signal (a second torque signal) Tref_b. The damper gain $D_G$ is obtained depending on the vehicle speed Vs by using a vehicle speed sensitive damper gain map that the damper gain section 123 has. The damper gain map, for example, as shown in FIG. 7, has a characteristic that the damper gain $D_G$ increases gradually as the vehicle speed Vs increases. The damper gain map may be variable depending on the steering angle θh. The damper gain section 123 and the multiplying section 125 constitute a damper calculating section.

The hysteresis correcting section 124 calculates a torque signal (a third torque signal) Tref_c based on the steering angle θh and the steering state STs in accordance with the following expression 3. In the following expression 3, x and y are set to θh and Tref_c respectively (x=θh and y=Tref_c), "a" is larger than 1 (a>1), "c" is larger than 0 (c>0), and "$A_{hys}$" is a hysteresis width.

$$\text{when right-turning } y_R = A_{hys}\{1 - a^{-c(x-b)}\} \quad \text{[Expression 3]}$$
$$\text{when left-turning } y_L = -A_{hys}\{1 - a^{c(x-b')}\}$$

When switching from the right-turning steering to the left-turning steering and when switching from the left-turning steering to the right-turning steering, based on the final coordinates (x1, y1), a value "b" of the following expression 4 is substituted into the value "b" in the expression 3 after switching. Thereby, continuity when switching the steering is maintained.

$$\text{when right-turning } b = x_1 + \frac{1}{c}\log_a\left(1 - \frac{y_1}{A_{hys}}\right) \quad \text{[Expression 4]}$$
$$\text{when left-turning } b' = x_1 - \frac{1}{c}\log_a\left(1 + \frac{y_1}{A_{hys}}\right)$$

The above expression 4 can be derived by substituting x1 for x and y1 for $y_R$ and $y_L$ in the above expression 3.

It is possible to use an arbitrary positive number larger than 1 as "a". For example, in the case of using Napier's constant "e", the expressions 3 and 4 are changed to the following expressions 5 and 6.

$$\text{when right-turning } y_R = A_{hys}[1 - \exp\{-c(x-b)\}] \quad \text{[Expression 5]}$$
$$\text{when left-turning } y_L = -A_{hys}[1 - \exp\{c(x-b')\}]$$
$$\text{when right-turning } b = x_1 + \frac{1}{c}\log_e\left(1 - \frac{y_1}{A_{hys}}\right) \quad \text{[Expression 6]}$$
$$\text{when left-turning } b' = x_1 - \frac{1}{c}\log_e\left(1 + \frac{y_1}{A_{hys}}\right)$$

Figure 8:
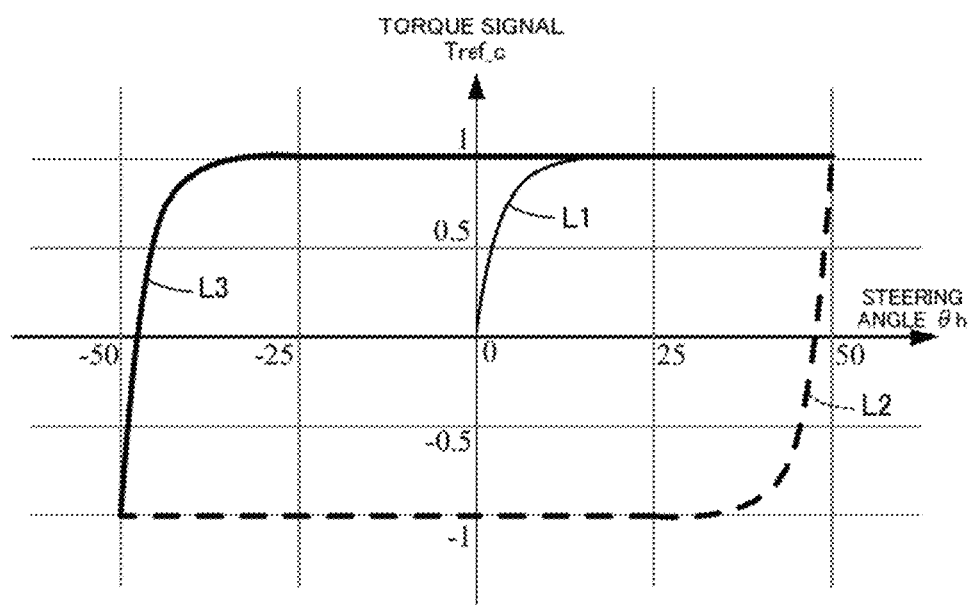
FIG. 8 is a diagram showing a characteristic example of a hysteresis correcting section.

Setting $A_{hys}$=1 [Nm] and c=0.3 in the expressions 5 and 6, in the case that an initial angle of the steering wheel is 0 [deg] and the steering wheel is steered between +50 [deg] and −50 [deg], a changing example of the torque signal Tref_c which hysteresis correction is applied to is shown in FIG. 8. That is, the torque signal Tref_c from the hysteresis correcting section 124 has a hysteresis characteristic shown by "the origin point →L1 (the thin line) →L2 (the broken line) →L3 (the thick line)".

"$A_{hys}$" which is a coefficient expressing an output width of the hysteresis characteristic, and "c" which is a coefficient expressing roundness, may be variable depending on the vehicle speed Vs and/or the steering angle θh.

The torque signals Tref_a, Tref_b and Tref_c are added at the adding sections 126 and 127, and the added result is outputted as the target steering torque Tref.

The steering angular velocity ωh is obtained by differential calculation to the steering angle θh, and low pass filter (LPF) processing is appropriately performed in order to reduce an affection of a noise in a high frequency band. The differential calculation and the LPF processing may be performed by using a high pass filter (HPF) and a gain. The steering angular velocity ωh may be calculated by the differential calculation and the LPF processing to the steering wheel angle $θ_1$ detected by the upper side angle sensor or the column angle $θ_2$ detected by the lower side angle sensor, instead of the steering angle θh. The motor angular velocity ωm may be used as the angular velocity information instead of the steering angular velocity ωh, and in this case, the differentiating section 122 becomes unnecessary.

The converting section 130 has a characteristic of "−1/Kt" obtained by inverting the sign of the reciprocal of the spring constant Kt of the torsion bar 2A, and converts the target steering torque Tref into a target torsional angle Δθref.

Figure 9:
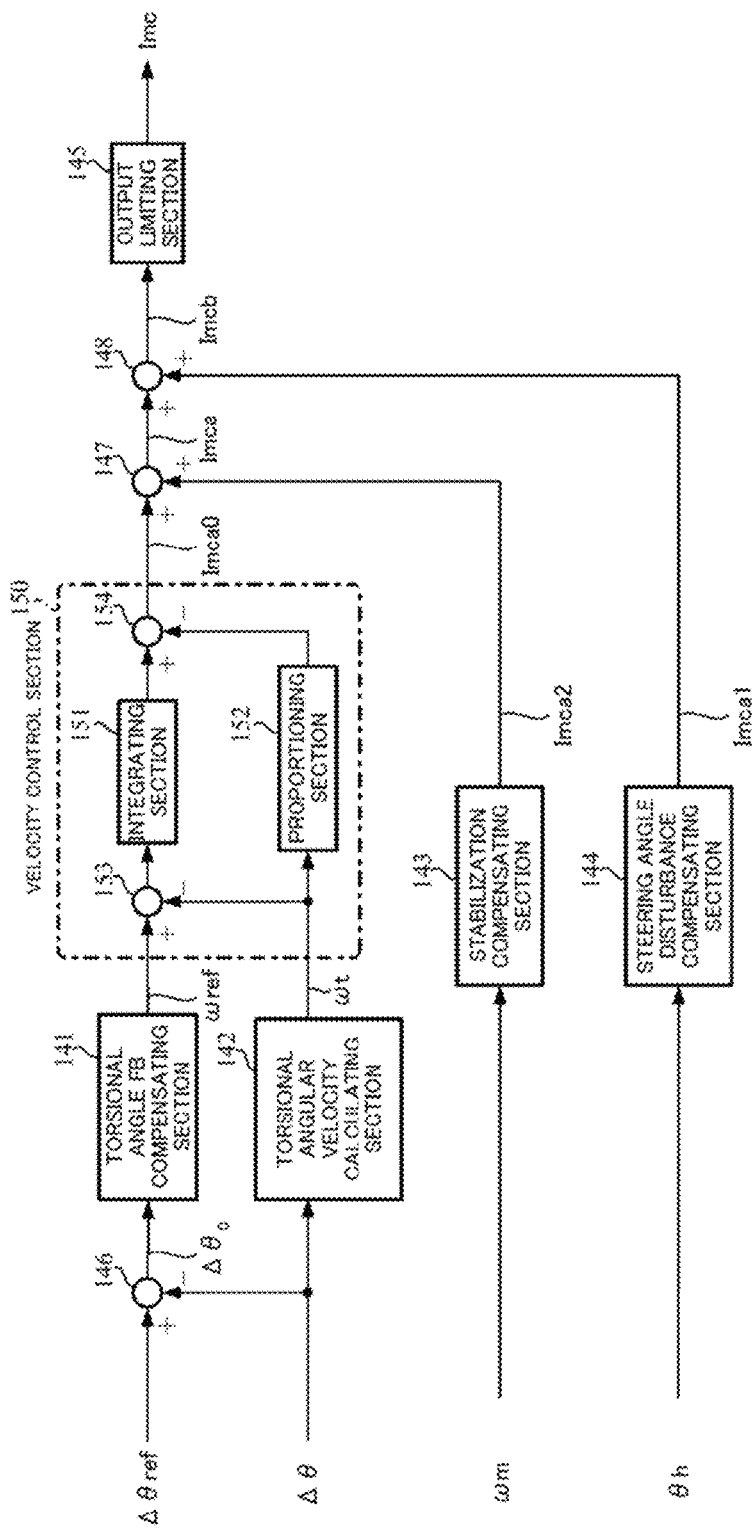
FIG. 9 is a block diagram showing a configuration example of a torsional angle control section.

The torsional angle control section 140 calculates the motor current command value Imc based on the target torsional angle Δθref, the torsional angle Δθ, the motor angular velocity ωm and the steering angle θh. FIG. 9 is a block diagram showing a configuration example of the torsional angle control section 140. The torsional angle control section 140 comprises a torsional angle feedback (FB) compensating section 141, a torsional angular velocity calculating section 142, a velocity control section 150, a stabilization compensating section 143, a steering angle disturbance compensating section 144, an output limiting section 145, a subtracting section 146, and adding sections 147 and 148. The target torsional angle Δθref outputted from the converting section 130 is addition-inputted into the subtracting section 146. The torsional angle Δθ is subtraction-inputted into the subtracting section 146, and is inputted into the torsional angular velocity calculating section 142. The motor angular velocity ωm is inputted into the stabilization compensating section 143. The steering angle θh is inputted into the steering angle disturbance compensating section 144.

The torsional angle FB compensating section 143 multiplies a deviation 400, which is calculated at the subtracting section 146, between the target torsional angle Δθref and the torsional angle Δθ by a compensation value $C_{FB}$ (a transfer function), and outputs a target torsional angular velocity ωref that enables followability of the torsional angle Δθ to the target torsional angle Δθref. The compensation value $C_{FB}$ may be simply a gain Kpp, or may be a compensation value generally used, such as a compensation value of PI control. The target torsional angular velocity ωref is inputted into the velocity control section 150. By using the torsional angle FB compensating section 141 and the velocity control section 150, the torsional angle Δθ follows the target torsional angle Δθref, and it is possible to obtain the desired steering torque.

The torsional angular velocity calculating section 142 calculates a torsional angular velocity ωt by differential calculation to the torsional angle Δθ, and the torsional angular velocity ωt is inputted into the velocity control section 150. Pseudo-differential by an HPF and a gain may be performed as the differential calculation. It is, further, possible to calculate the torsional angular velocity ωt by other means or using values except for the torsional angle Δθ, and input it into the velocity control section 150.

The velocity control section 150 calculates a motor current command value (a basic motor current command value) Imca0 that enables followability of the torsional angular velocity ωt to the target torsional angular velocity ωref, by proportional preceding type PI control (I-P control). The velocity control section 150 calculates a difference (ωref−ωt) between the target torsional angular velocity ωref and the torsional angular velocity ωt at a subtracting section 153, and integrates the difference at an integrating section 151 having a gain Kvi. The integrated result is addition-inputted into a subtracting section 154. The torsional angular velocity ωt is inputted into a proportioning section 152 also, and proportional processing by a gain Kvp is performed. The result is subtraction-inputted into the subtracting section 154. The subtracted result of the subtracting section 154 is outputted as the motor current command value Imca0. The velocity control section 150 may calculate the motor current command value Imca0 by control methods generally used, such as PI control, proportional (P) control, proportional integral differential (PID) control, differential preceding type PID control (PI-D control), model matching control, model reference control and so on, instead of I-P control.

The stabilization compensating section 143 has a compensation value Cs (a transfer function), and calculates a motor current command value Imca2 by using the motor angular velocity ωm. In the case of increasing gains of the torsional angle FB compensating section 141 and the velocity control section 150 to improve followability and a disturbance characteristic, a high-frequency control oscillation phenomenon occurs. A countermeasure for this is to set the transfer function (Cs) that is applied to the motor angular velocity ωm and is necessary for stabilization, to the stabilization compensating section 143. This enables stabilization of the whole EPS control system. As the transfer function (Cs) of the stabilization compensating section 143, for example, a primary filter that is set by pseudo-differential using a primary HPF structure, and a gain, is used. The primary filter is expressed by the following expression 7, $$C_s = K_{sta} \frac{\frac{1}{2\pi f_c} s}{\frac{1}{2\pi f_c} s + 1}$$ [Expression 7]

"$K_{sta}$" is a gain. "fc" is a center frequency and, for example, is set to 150 [Hz]. "s" is Laplace operator. It is possible to use a secondary filter, a quaternary filter or the like as the transfer function.

The steering angle disturbance compensating section 144 calculates a motor current command value (a first compensation motor current command value) Imca1 by using the steering angle θh. In the case that a rapid change of the steering angle occurs, such as in abrupt steering, the followability of the torsional angle to the target torsional angle is likely to get worse. The steering angle disturbance compensating section 144 is set to solve this. The steering angle disturbance compensating section 144 is constituted of a filter and a gain to the steering angle θh. The steering angle disturbance compensating section 144, for example, is a configuration of multiplying a secondary filter by a gain, which is a transfer function Gh, as expressed by the following expression 8.

$$G_h = K_h \frac{s^2}{s^2 + 2\zeta_n \omega_n s + c\omega_n^2}$$ [Expression 8]

"$K_h$" is a gain, "ζn" is a damping coefficient, and ωn=2π×fn, where "fn" is a cutoff frequency. For example, "ζn" is set to 1 and "fn" is set to 50 [Hz] (ζn=1 and fn=50 [Hz]). It is possible to use a filter whose degree is other than 2, and apply an effective filter based on an experiment or the like, as the transfer function Gh.

The motor current command value Imca0 outputted from the velocity control section 150 is compensated by adding the motor current command value Imca2 outputted from the stabilization compensating section 143 at the adding section 147, and adding the motor current command value Imca1 outputted from the steering angle disturbance compensating section 144 at the adding section 148. The added result is outputted as a motor current command value Imcb.

Figure 10:
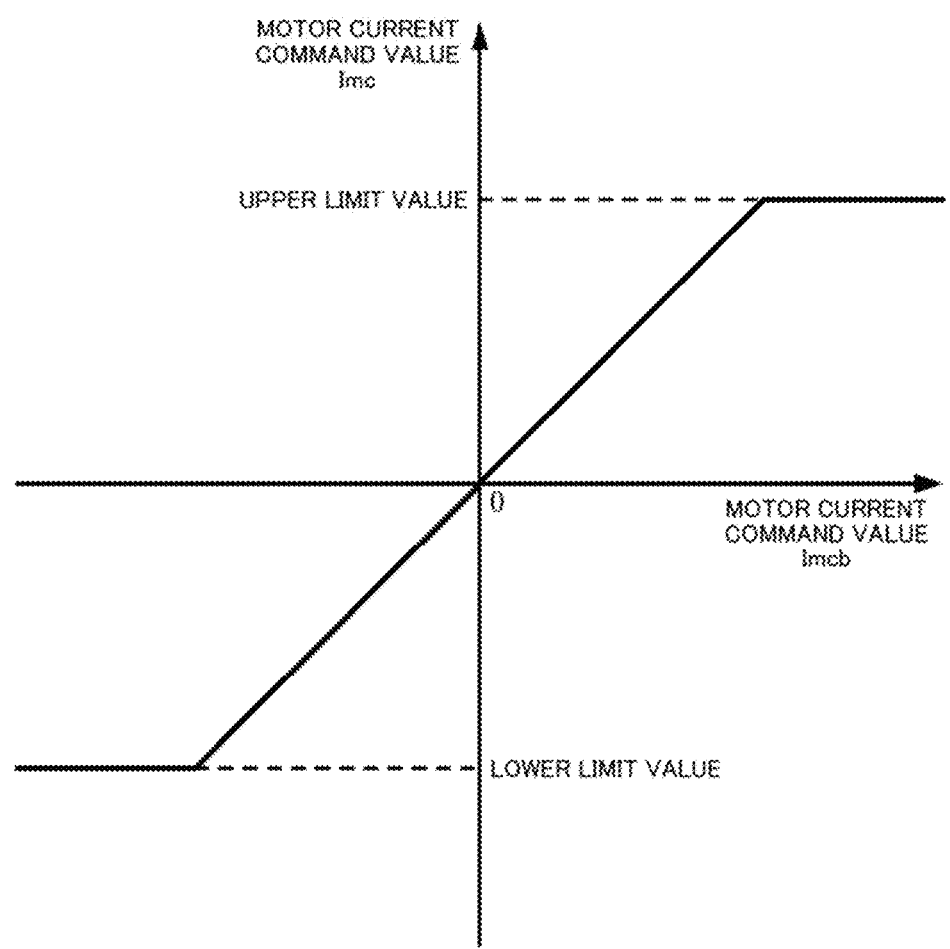
FIG. 10 is a diagram showing an example of setting an upper limit value and a lower limit value in an output limiting section.

The output limiting section 145 limits upper and lower limit values of the motor current command value Imcb, and outputs the motor current command value Imc. As shown in FIG. 10, the output limiting section 145 presets the upper limit value and the lower limit value with respect to the motor current command value. In the case that the motor current command value Imcb is larger than or equal to the upper limit value, the output limiting section 145 outputs the upper limit value as the motor current command value Imc. In the case that the motor current command value Imcb is smaller than or equal to the lower limit value, the output limiting section 145 outputs the lower limit value as the motor current command value Imc. Otherwise, the output limiting section 145 outputs the motor current command value Imcb, as it is, as the motor current command value Imc.

In such a configuration, an operating example of the present embodiment will be described with reference to flowcharts of FIGS. 11 to 13.

As the operation starts, the right-turning/left-turning judging section 110 inputs the motor angular velocity ωm, judges whether steering is right-turning or left-turning based on a sign of the motor angular velocity ωm, and outputs the judgment result as the steering state STs to the target steering torque generating section 120 (Step S10).

The target steering torque generating section 120 inputs the steering angle θh and the vehicle speed Vs with the steering state STs, and generates the target steering torque Tref (Step S20). An operating example of the target steering torque generating section 120 will be described with reference to the flowchart of FIG. 12.

With respect to the steering angle θh, the steering state STs and the vehicle speed Vs that have been inputted into the target steering torque generating section 120, the steering angle θh is inputted into the basic map section 121, the differentiating section 122 and the hysteresis correcting section 124, the steering state STs is inputted into the hysteresis correcting section 124, and the vehicle speed Vs is inputted into the basic map section 121 and the damper gain section 123 (Step S21).

The basic map section 121 generates the torque signal Tref_a corresponding to the steering angle θh and the vehicle speed Vs by using the basic map shown in FIG. 6A or 6B, and outputs it to the adding section 126 (Step S22).

The differentiating section 122 differentiates the steering angle θh, and outputs the steering angular velocity ωh (Step S23). The damper gain map 123 outputs the damper gain De corresponding to the vehicle speed Vs by using the damper gain map shown in FIG. 7 (Step S24). The multiplying section 125 calculates the torque signal Tref_b by multiplying the steering angular velocity ωh and the damper gain $D_G$, and outputs it to the adding section 127 (Step S25).

The hysteresis correcting section 124 performs the hysteresis correction to the steering angle θh by switching the calculations of the expressions 5 and 6 depending on the steering state STs (Step S26), generates the torque signal Tref_c, and outputs it to the adding section 127 (Step S27). The hysteresis width $A_{hys}$, "c", x1 and y1 in the expressions 5 and 6 are preset and retained. It is possible to calculate "b" and "b'" in advance by the expression 6, and retain "b" and "b'" instead of x1 and y1.

The torque signals Tref_b and Tref_c are added at the adding section 127, the torque signal Tref_a is added to the added result at the adding section 126, and the target steering torque Tref is calculated (Step S28).

The target steering torque Tref generated at the target steering torque generating section 120 is inputted into the converting section 130, and is converted into the target torsional angle Δθref at the converting section 130 (Step S30). The target torsional angle Δθref is inputted into the torsional angle control section 140.

The torsional angle control section 140 inputs the torsional angle Δθ, the motor angular velocity ωm and the steering angle θh with the target torsional angle Δθref, and calculates the motor current command value Imc (Step S40). An operating example of the torsional angle control section 140 will be described with reference to the flowchart of FIG. 13.

With respect to the target torsional angle Δθref, the torsional angle Δθ, the motor angular velocity ωm and the steering angle θh that have been inputted into the torsional angle control section 140, the target torsional angle Δθref is inputted into the subtracting section 146, the torsional angle Δθ is inputted into the subtracting section 146 and the torsional angular velocity calculating section 142, the motor angular velocity ωm is inputted into the stabilization compensating section 143, and the steering angle θh is inputted into the steering angle disturbance compensating section 144 (Step S41).

The deviation $Δθ_0$ is calculated at the subtracting section 146 by subtracting the torsional angle Δθ from the target torsional angle Δθref (Step S42). The deviation $Δθ_0$ is inputted into the torsional angle FB compensating section 141. The torsional angle FB compensating section 141 compensates the deviation $Δθ_0$ by multiplying the deviation 400 by the compensation value $C_{FB}$ (Step S43), and outputs the target torsional angular velocity ωref to the velocity control section 150.

The torsional angular velocity calculating section 142 inputting the torsional angle Δθ calculates the torsional angular velocity ωt by the differential calculation to the torsional angle Δθ (Step S44), and outputs it to the velocity control section 150.

In the velocity control section 150, the difference between the target torsional angular velocity ωref and the torsional angular velocity ωt is calculated at the subtracting section 153, the difference is integrated (Kvi/s) at the integrating section 151, and the integrated result is addition-inputted into the subtracting section 154 (Step S45). The proportional processing (Kvp) is applied to the torsional angular velocity ωt at the proportioning section 152, and the proportioned result is subtraction-inputted into the subtracting section 154 (Step S45). The motor current command value Imca0 being the subtracted result of the subtracting section 154 is inputted into the adding section 147.

The stabilization compensating section 143 performs the stabilization compensation to the inputted motor angular velocity ωm by using the transfer function Cs expressed by the expression 7 (Step S46). The motor current command value Imca2 outputted from the stabilization compensating section 143 is inputted into the adding section 147.

The motor current command value Imca2 is added to the motor current command value Imca0 at the adding section 147 (Step S47). The motor current command value Imca being the added result is inputted into the adding section 148.

The steering angle disturbance compensating section 144 calculates the motor current command value Imca1 by the filter processing to the inputted steering angle θh in accordance with the transfer function Gh expressed by the expression 8 (Step S48). The motor current command value Imca1 is inputted into the adding section 148.

The motor current command value Imca1 is added to the motor current command value Imca at the adding section 148 (Step S49). The motor current command value Imcb being the added result is inputted into the output limiting section 145. The output limiting section 145 limits the upper and lower limit values of the motor current command value Imcb by the preset upper limit value and lower limit value (Step S50), and outputs the limited result as the motor current command value Imc (Step S51).

Current control is performed by driving the motor based on the motor current command value Imc outputted from the torsional angle control section 140 (Step S60).

Figure 11:
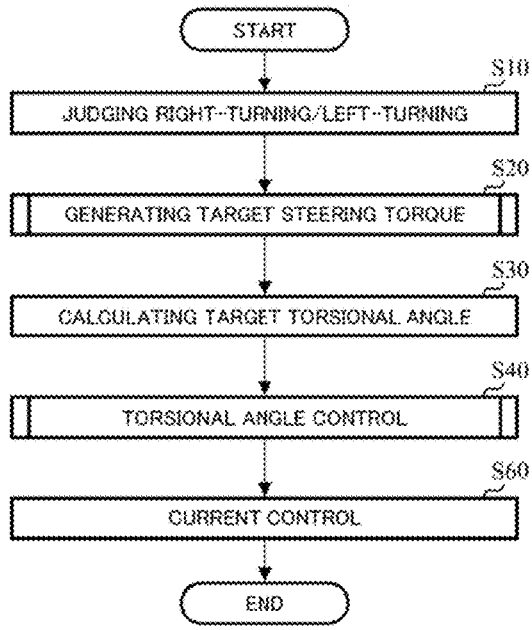
FIG. 11 is a flowchart showing an operating example (the first embodiment) of the present invention.
Figure 12:
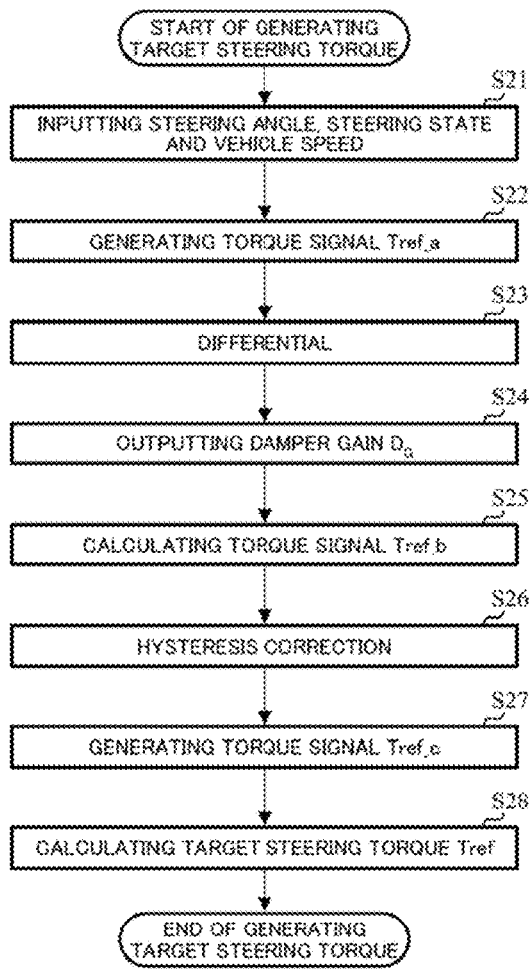
FIG. 12 is a flowchart showing an operating example of the target steering torque generating section.
Figure 13:
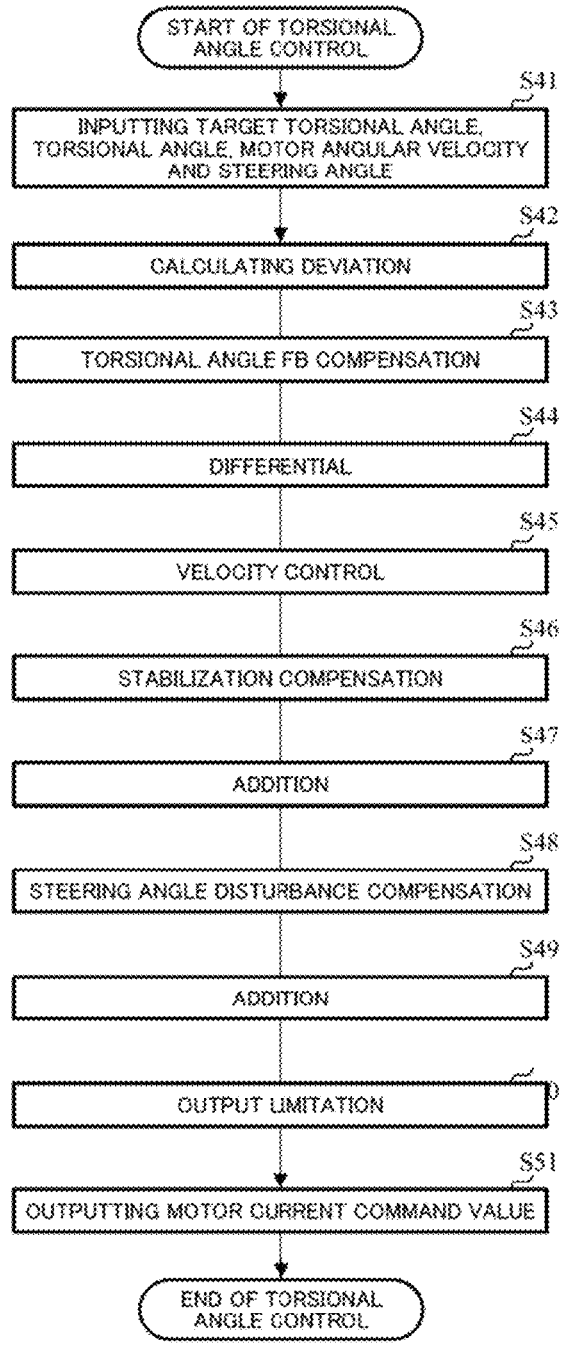
FIG. 13 is a flowchart showing an operating example of the torsional angle control section.

Each order of the data inputs, the calculations and so on in FIGS. 11 to 13 is appropriately changeable.

An effect of the steering angle disturbance compensating section in the present embodiment will be described based on a simulation result.

Figure 14:
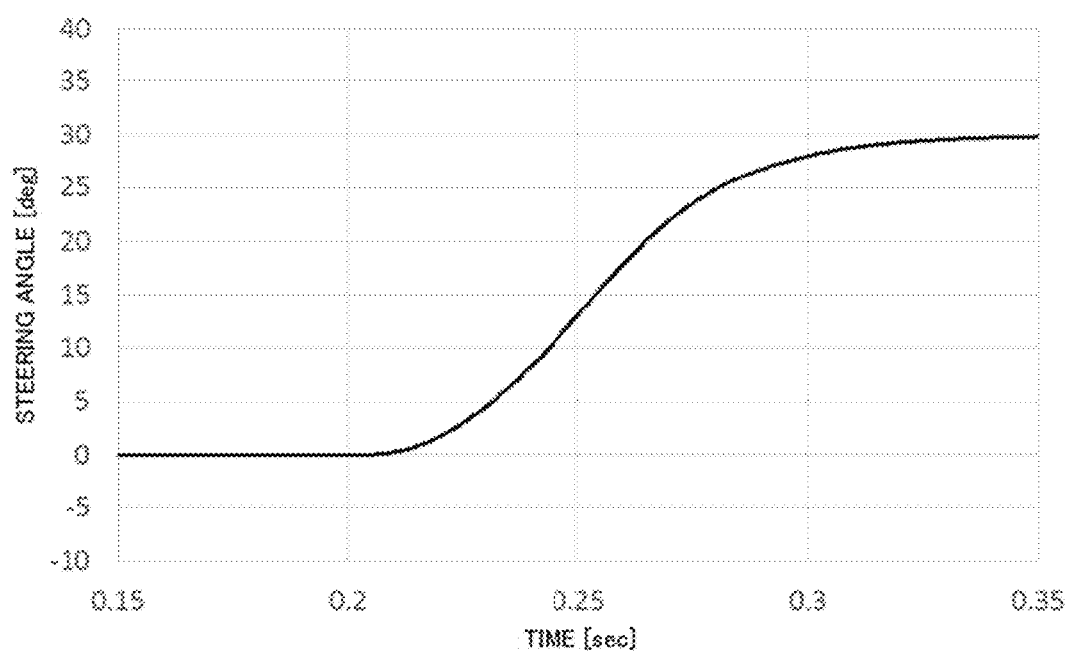
FIG. 14 is a graph showing an example of an inputted steering angle in a simulation showing an effect of a steering angle disturbance compensating section.

In the simulation, assuming abrupt steering, the steering angle θh changed from 0 deg to 30 deg as shown in FIG. 14 is inputted, and time responses of the steering torque are examined in the case of performing the compensation by the steering angle disturbance compensating section (hereinafter referred to as "performing steering angle disturbance compensation") and in the case of not performing it (hereinafter referred to as "not performing steering angle disturbance compensation"). In FIG. 14, a horizontal axis shows a time [sec], and a vertical axis shows a steering angle [deg]. The steering angle θh increases from 0 deg in the vicinity of past 0.2 see, and becomes 30 deg in the vicinity 0.35 sec.

Figure 15A:
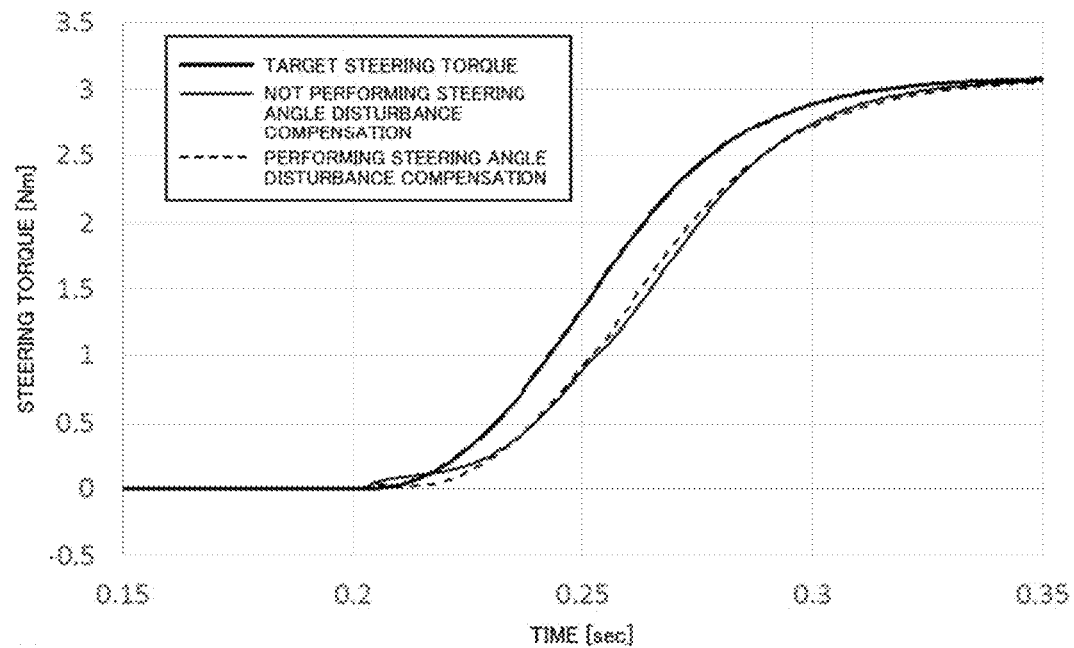
FIGS. 15A and 15B are graphs showing a result of the simulation showing the effect of the steering angle disturbance compensating section.
Figure 15B:
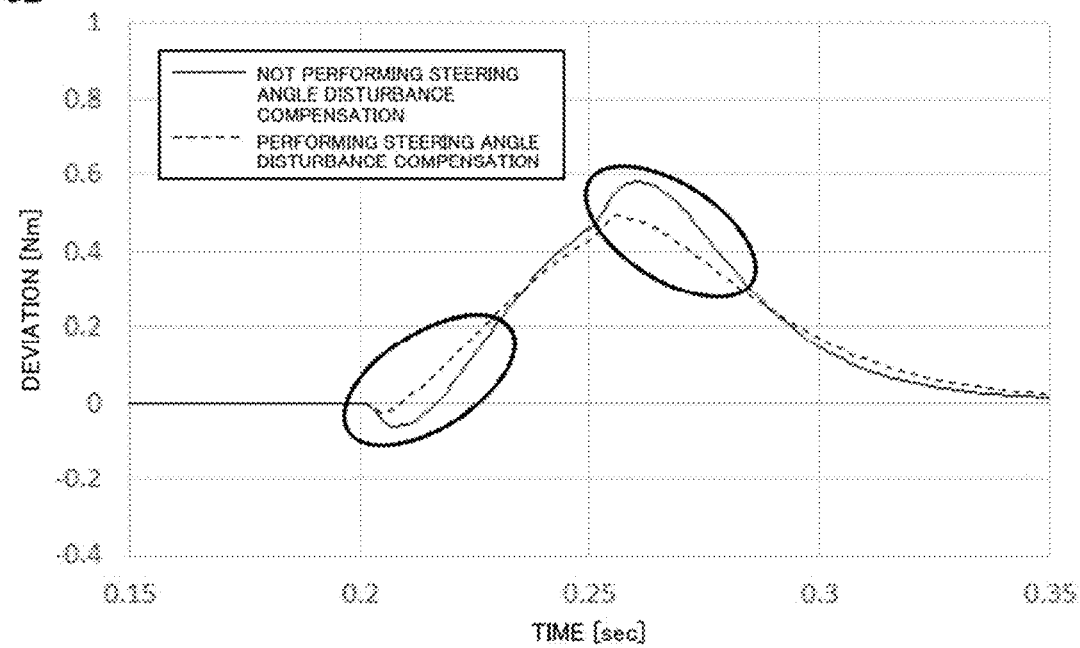

The simulation result is shown in FIGS. 15A and 15B. In FIG. 15A, a horizontal axis shows a time [sec], a vertical axis shows a steering torque [N·m], a thick line shows a target steering torque, a thin line shows a steering torque in the case of not performing steering angle disturbance compensation, and a broken line shows a steering torque in the case of performing steering angle disturbance compensation. Since it is desired to follow a target value even in abrupt steering, a deviation between the target steering torque and each steering torque is shown in FIG. 15B so that a difference from the target steering torque being a target value is made clear. In FIG. 15B, a horizontal axis shows a time [sec], a vertical axis shows a deviation [N·m], a solid line shows a deviation in the case of not performing steering angle disturbance compensation, and, and a broken line shows a deviation in the case of performing steering angle disturbance compensation. With reference to the areas surrounded with circles in FIG. 15B, it is found out that though the deviation from the target steering torque is large in the case of not performing steering angle disturbance compensation, the deviation is reduced by performing the steering angle disturbance compensation Another configuration example of the present invention will be described.

Figure 2:
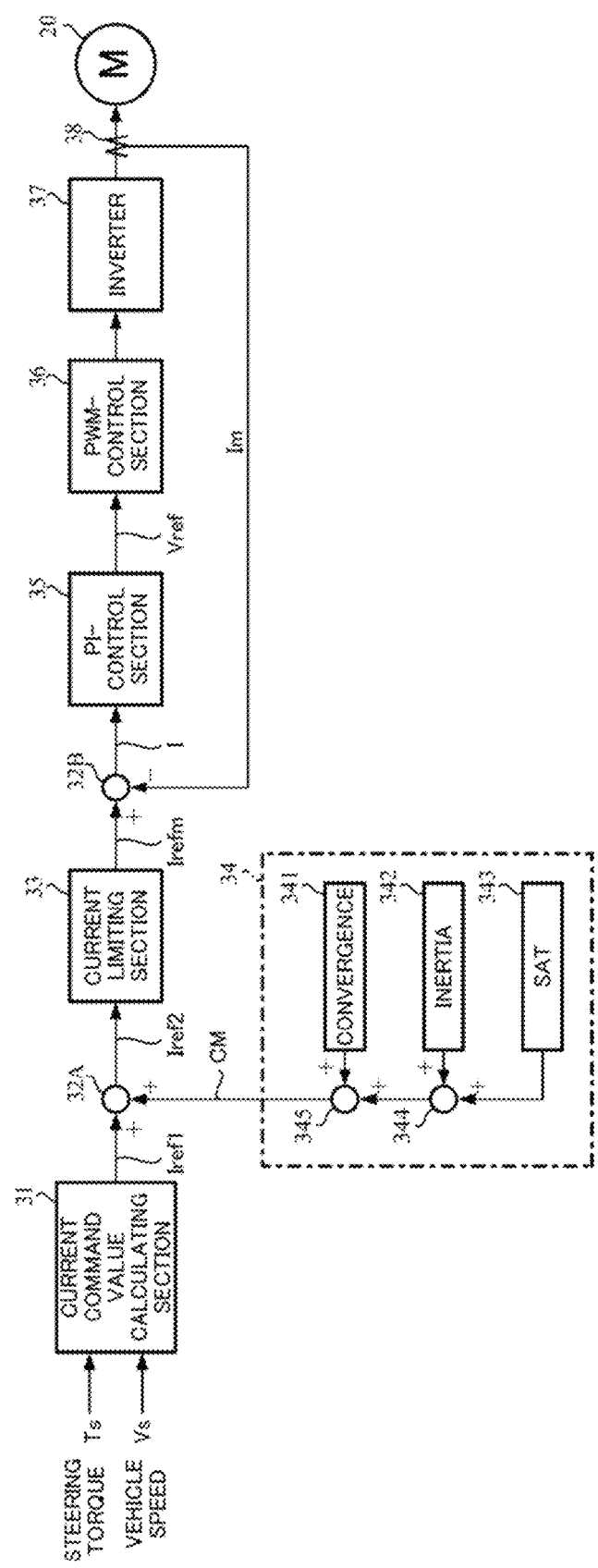
FIG. 2 is a block diagram showing a configuration example of a control unit (ECU) of the electric power steering apparatus.

It is possible to add a current command value (hereinafter referred to as "assist current command value") calculated based on a steering torque in a conventional EPS, such as a current command value Iref1 outputted from a current command value calculating section 31, a current command value Iref2 obtained by adding a compensation signal CM to the current command value Iref1 in FIG. 2, etc., to the motor current command value Imc outputted from the torsional angle control section in the first embodiment.

Figure 16:
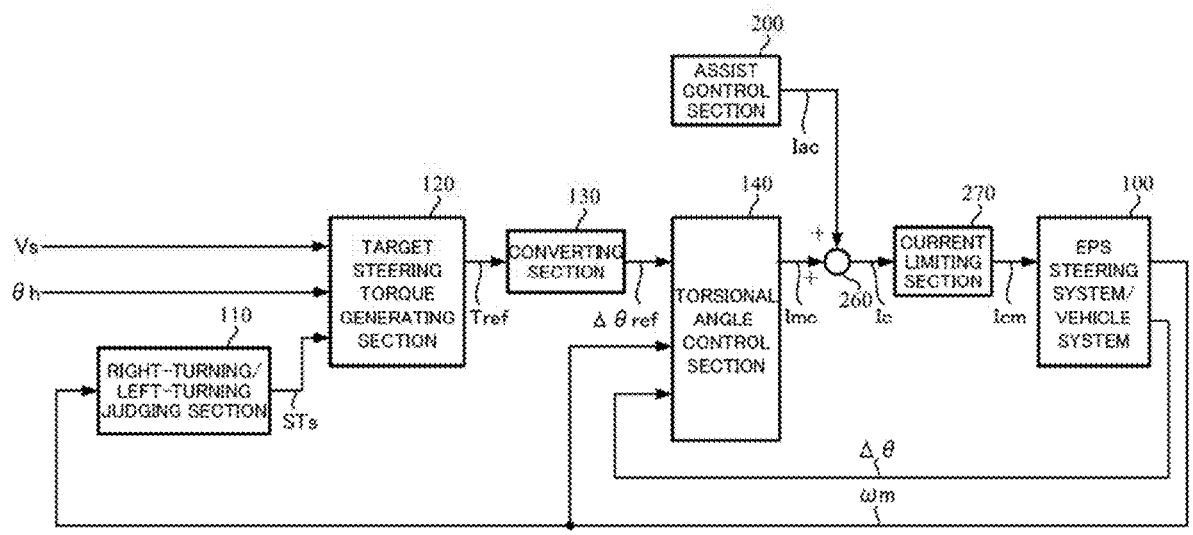
FIG. 16 is a block diagram showing a configuration example (a second embodiment) of the present invention.

A configuration example (a second embodiment) of applying the above to the first embodiment is shown in FIG. 16. An assist control section 200 is constituted of the current command value calculating section 31, or the current command value calculating section 31, a compensation signal generating section 34 and an adding section 32A. An assist current command value Iac (corresponding to the current command value Iref1 or Iref2 in FIG. 2) outputted from the assist control section 200 and the motor current command value Imc outputted from the torsional angle control section 140 are added at an adding section 260, a current command value Ic of the added result is inputted into a current limiting section 270, a motor is driven based on a current command value Icm whose maximum current is limited, and the current control is performed.

Figure 17A:
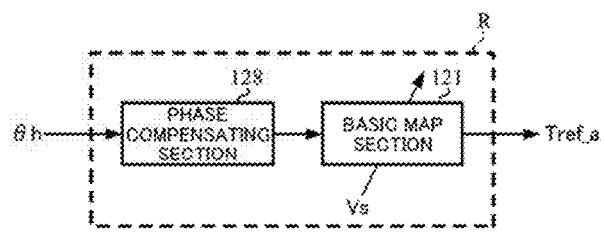
FIGS. 17A and 17B are block diagrams showing an example of inserting a phase compensating section.
Figure 17B:
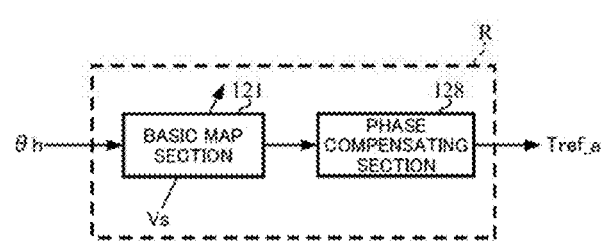

With respect to the target steering torque generating section 120 in the first and the second embodiments, in such a case of focusing on a cost and a processing time, it is possible to leave at least one of the basic map section 121, the damper calculating section, and the hysteresis correcting section 124, and omit others. In the case of omitting the basic map section 121, the adding section 126 can be also omitted. In the case of omitting the damper calculating section, the differentiating section 122 and the adding section 127 can be also omitted. In the case of omitting the hysteresis correcting section 124, the right-turning/left-turning judging section 110 and the adding section 127 can be also omitted. Further, it is possible to insert a phase compensating section 128 performing phase compensation into a front stage or a rear stage of the basic map section 121. That is, it is possible to change a configuration of an area "R" surrounded by a broken line in FIG. 5 to a configuration shown in FIG. 17A or 17B. In the case of setting phase advance compensation as the phase compensation in the phase compensating section 128, and, for example, performing the phase advance compensation by a primary filter where a cutoff frequency of a numerator is set to 1.0 Hz and a cutoff frequency of a denominator is set to 1.3 Hz, comfortable feeling can be achieved. With respect to the target steering torque generating section, if it is configured based on the steering angle, the configuration is not limited to the above configurations.

Further, in the case that the EPS control system stable, it is possible to omit the stabilization compensating section. The output limiting section can be also omitted.

Figure 1:
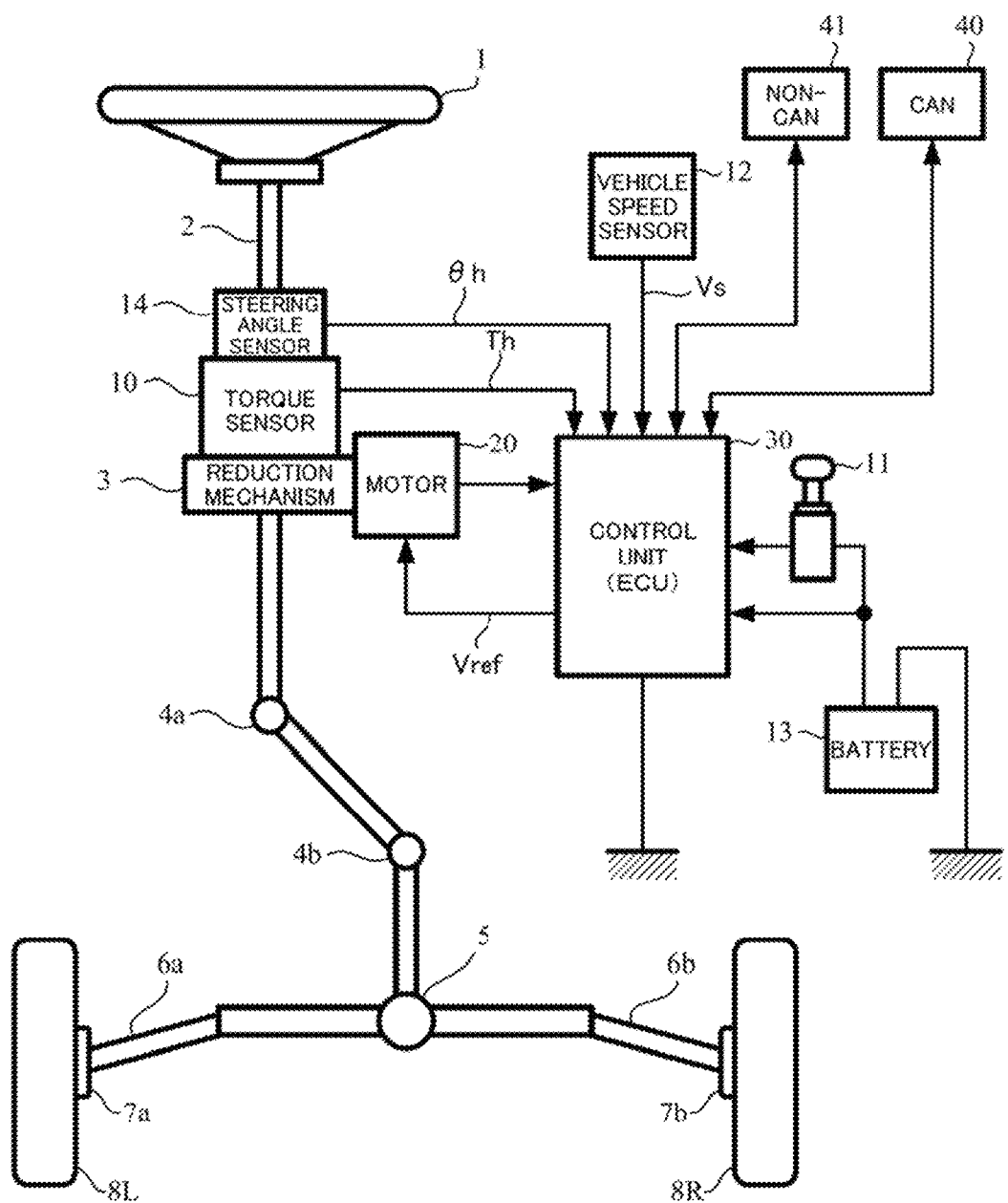
FIG. 1 is a configuration diagram illustrating a general outline of an electric power steering apparatus.

Although the present invention is applied to a column-type EPS in FIGS. 1 and 3, the present invention is not limited to an upstream-type EPS such as the column-type EPS, and can also be applied to a downstream-type EPS such as a rack-and-pinion type EPS. Further, in a viewpoint that the feedback control is performed based on the target torsional angle, the present invention can be applied to a steer-by-wire (SBW) reaction force apparatus which comprises at least a torsion bar whose spring constant is arbitrary and a sensor for detecting the torsional angle, and so on. An embodiment (a third embodiment) in the case of applying the present invention to an SBW reaction force apparatus with a torsion bar, will be described.

Figure 18:
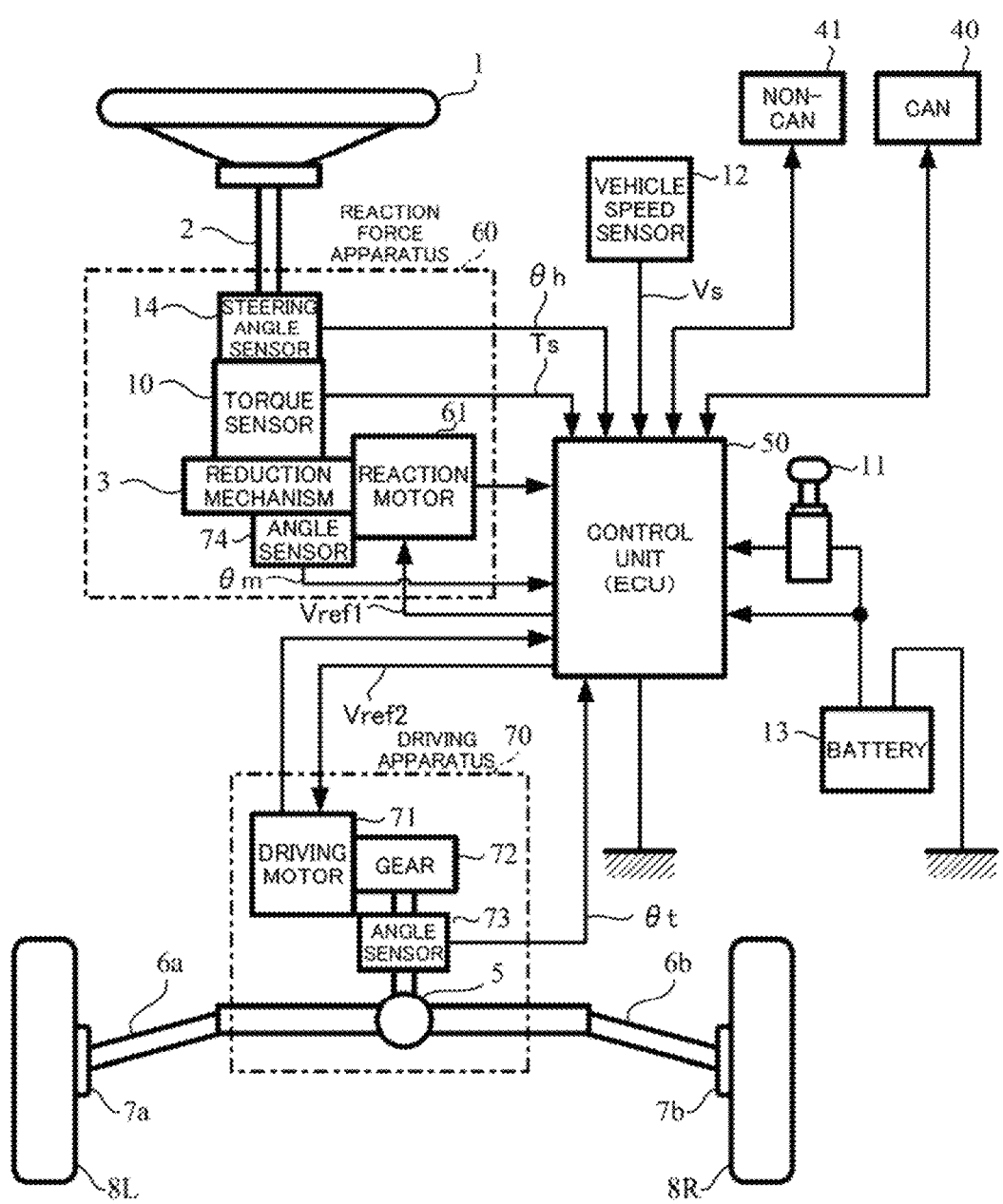
FIG. 18 is a configuration diagram illustrating a general outline of a steer-by-wire (SBW) system.

First, a whole SBW system including an SBW reaction force apparatus will be described. FIG. 18 is a diagram that shows a configuration example of an SBW system corresponding to a general configuration of the electric power steering apparatus shown in FIG. 1. The same configurations are designated with the same numerals, and detailed explanations are omitted.

The SBW system does not comprise an intermediate shaft that is mechanically connected with the column shaft 2 at a universal joint 4a, and communicates an operation of a steering wheel 1 to a turning mechanism comprising steered wheels 8L and 8R and so on in accordance with an electric signal. As shown in FIG. 18, the SBW system comprises a reaction force apparatus 60 and a driving apparatus 70, and a control unit (ECU) 50 controls both apparatuses. The reaction force apparatus 60 detects the steering angle θh by using a steering angle sensor 14, and at the same time, transmits a motion state of a vehicle which is transmitted from the steered wheels 8L and 8R, to a driver as a reaction torque. The reaction torque is generated by a reaction motor 61. Although some types of SBW systems do not have a torsion bar, the SBW system to which the present invention is applied, has a torsion bar, and detects the steering torque Ts by using a torque sensor 10. An angle sensor 74 detects a motor angle θm of the reaction motor 61. The driving apparatus 70 drives a driving motor 71 in accordance with steering of the steering wheel 1 by a driver, applies the driving force to a rack-and-pinion mechanism 5 via a gear 72, and turns the steered wheels 8L and 8R through tie rods 6a and 6b. An angle sensor 73 is provided in the vicinity of the rack-and-pinion mechanism 5, and detects a turning angle θt of the steered wheels 8L and 8R. The ECU 50 generates a voltage control command value Vref1 to drive and control the reaction motor 61 and a voltage control command value Vref2 to drive and control the driving motor 71 on the basis of the vehicle speed Vs from a vehicle speed sensor 12 and so on in addition to such information as the steering angle θh and the turning angle θt that are outputted from the reaction force apparatus 60 and the driving apparatus 70, in order to cooperatively control both apparatuses.

A configuration of the third embodiment of applying the present invention to such an SBW system will be described.

Figure 19:
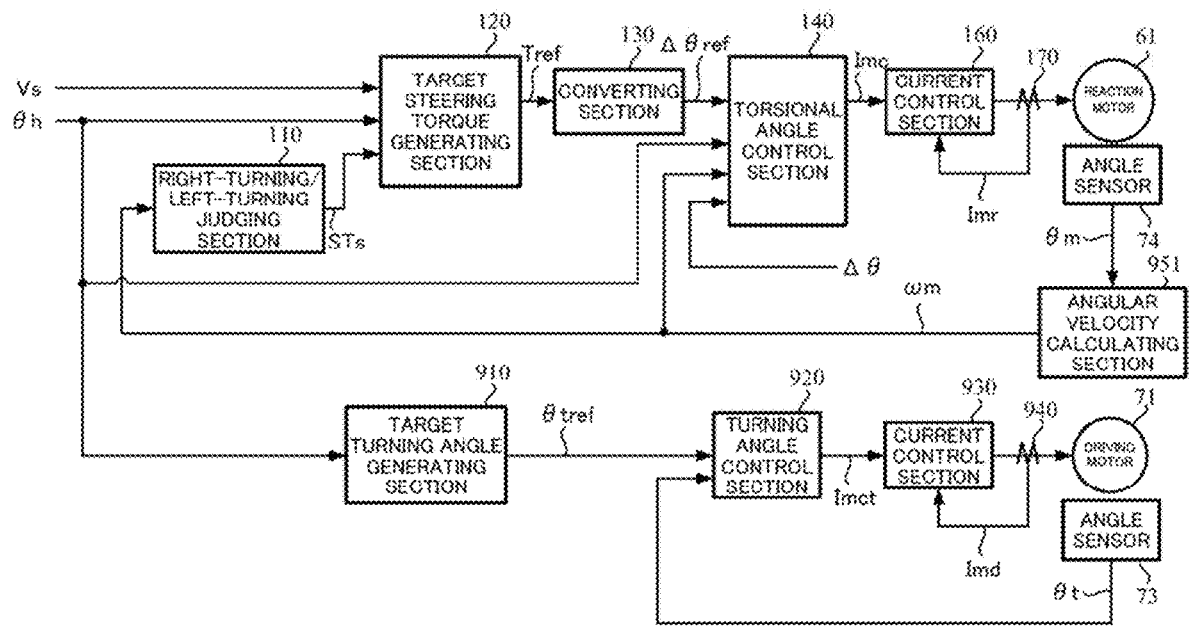
FIG. 19 is a block diagram showing a configuration example (a third embodiment) of the present invention.

FIG. 19 is a block diagram showing the configuration of the third embodiment. The third embodiment performs control to the torsional angle Δθ (hereinafter referred to as "torsional angle control") and control to the turning angle θt (hereinafter referred to as "turning angle control"), controls the reaction apparatus by the torsional angle control, and controls the driving apparatus by the turning angle control. The driving apparatus may be controlled by another control method.

In the torsional angle control, the control is performed that the torsional angle Δθ follows the target torsional angle Δθref which is calculated through the target steering torque generating section 120 and the converting section 130 by using the steering angle θh and so on, with the same configuration and operation as the first embodiment. The motor angle θm is detected by the angle sensor 74, and the motor angular velocity ωm is calculated by differentiating the motor angle θm at an angular velocity calculating section 951. The turning angle θt is detected by the angle sensor 73. In the first embodiment, a current control section 160, whose processing is considered as a part of processing of the EPS steering system/vehicle system 100, is not described in detail. The current control section 160 performs current control by driving the reaction motor 61 on the basis of the motor current command value Imc outputted from the torsional angle control section 140 and a current value Imr of the reaction motor 61 detected by a motor current detector 170, with the same configurations and operations as a subtracting section 32B, a PI-control section 35, a PWM-control section 36 and an inverter 37 shown in FIG. 2.

In the turning angle control, a target turning angle θtref is generated on the basis of the steering angle θh at a target turning angle generating section 910, the target turning angle θtref is inputted into a turning angle control section 920 with the turning angle θt, and a motor current command value Imct is calculated at the turning angle control section 920 so that the turning angle θt becomes the target turning angle θtref. A current control section 930 performs current control by driving the driving motor 71 on the basis of the motor current command value Imct and a current value Imd of the driving motor 71 detected by a motor current detector 940, with the same configuration and operation as the current control section 160.

Figure 20:
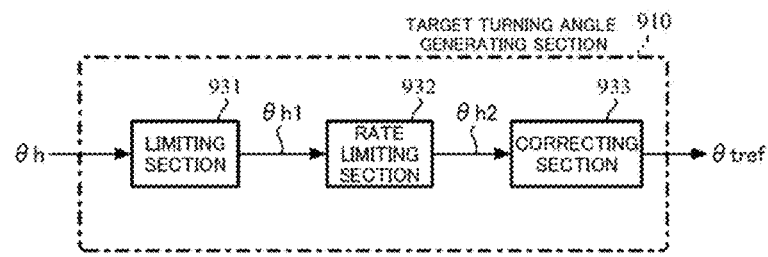
FIG. 20 is a block diagram showing a configuration example of a target turning angle generating section.

A configuration example of the target turning angle generating section 910 is shown in FIG. 20. The target turning angle generating section 910 comprises a limiting section 931, a rate limiting section 932 and a correcting section 933.

The limiting section 931 limits upper and lower limit values of the steering angle θh, and outputs a steering angle θh1. As with the output limiting section 145 in the torsional angle control section 140, the limiting section 931 performs the limitation by presetting the upper limit value and the lower limit value with respect to the steering angle θh.

In order to avoid an abrupt change in the steering angle, the rate limiting section 932 limits a change amount of the steering angle θh1 by setting a limit value, and outputs a steering angle θh2. For example, a difference between the present and the previous steering angles θh1 is used as the change amount, when an absolute value of the change amount is larger than a predetermined value (the limit value), addition or subtraction to the steering angle θh1 is performed so that the absolute value of the change amount becomes the limit value, and the result is outputted as the steering angle θh2. When the absolute value of the change amount is smaller than or equal to the limit value, the steering angle θh1 is outputted, as it is, as the steering angle θh2. Instead of setting the limit value to the absolute value of the change amount, the limitation may be performed by setting an upper limit value and a lower limit value to the change amount. It is possible to limit a change rate or a difference rate instead of the change amount.

The correcting section 933 corrects the steering angle θh2, and outputs the target turning angle θtref. For example, as with the basic map section 121 in the target steering torque generating section 120, the correcting section 933 obtains the target turning angle θtref in accordance with the steering angle θh2 by using a map defining a characteristic of the target turning angle θtref to a magnitude |θh2| of the steering angle θh2. Alternatively, the correcting section 933 may obtain the target turning angle θtref simply by multiplying the steering angle θh2 by a predetermined gain.

Figure 21:
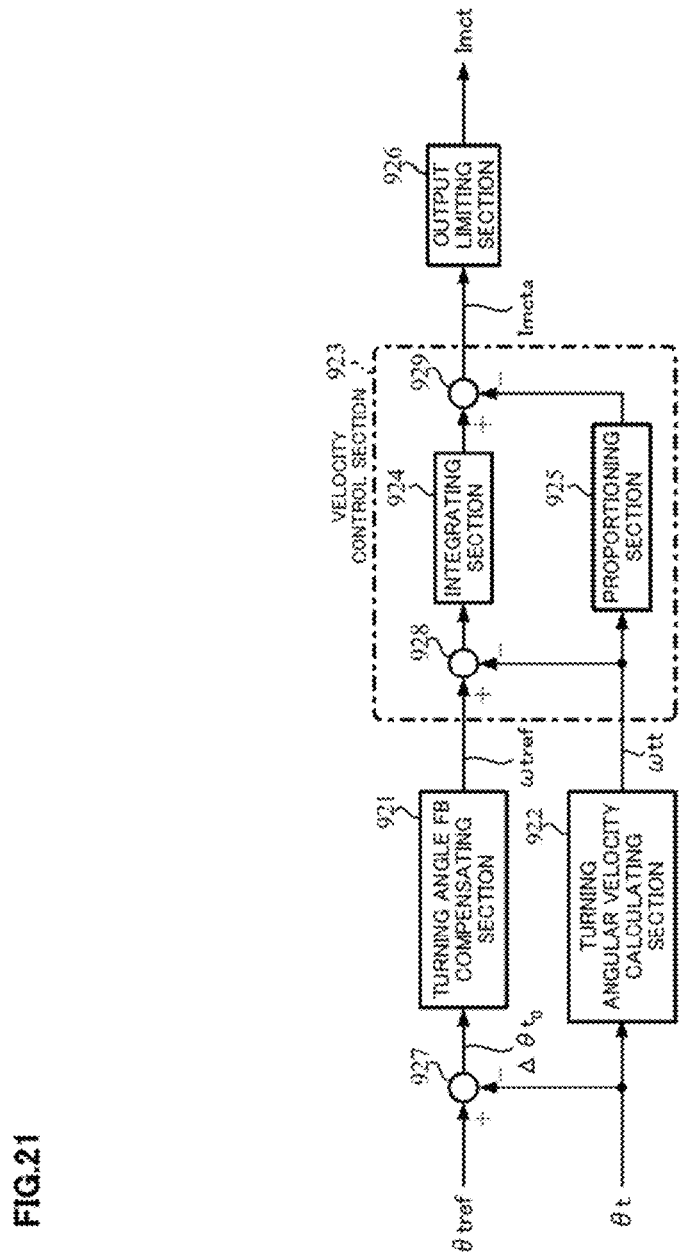
FIG. 21 is a block diagram showing a configuration example of a turning angle control section.

A configuration example of the turning angle control section 920 is shown in FIG. 21. The turning angle control section 920 has the same configuration as the configuration of removing the stabilization compensating section 143, the steering angle disturbance compensating section 144 and the adding sections 148 and 149 from the configuration example of the torsional angle control section 140 shown in FIG. 9. The turning angle control section 920 inputs the target turning angle θtref and the turning angle θt instead of the target torsional angle Δθref and the torsional angle 40. A turning angle feedback (FB) compensating section 921, a turning angular velocity calculating section 922, a velocity control section 923, an output limiting section 926 and a subtracting section 927 have the same configurations and perform the same operations as the torsional angle FB compensating section 141, the torsional angular velocity calculating section 142, the velocity control section 150, the output limiting section 145 and the subtracting section 147 respectively.

In such a configuration, an operating example of the third embodiment will be described with reference to a flowchart of FIG. 22.

As the operation starts, the angle sensor 73 detects the turning angle θt, and the angle sensor 74 detects the motor angle θm (Step S110). The turning angle θt is inputted into the turning angle control section 920, and the motor angle θm is inputted into the angular velocity calculating section 951.

The angular velocity calculating section 951 calculates the motor angular velocity ωm by differentiating the motor angle θm, and outputs it to the right-turning/left-turning judging section 110 and the torsional angle control section 140 (Step S120).

After that, in the torsional angle control, the same operations as steps S10 to S60 shown in FIG. 11 are performed, the reaction motor 61 is driven, and the current control is performed (Steps S130 to S170).

In the meantime, in the turning angle control, the target turning angle generating section 910 inputs the steering angle θh. The steering angle θh is inputted into the limiting section 931. The limiting section 931 limits the upper and lower limit values of the steering angle θh by the preset upper limit value and lower limit value (Step S180), and outputs the limited result as the steering angle θh1 to the rate limiting section 932. The rate limiting section 932 limits the change amount of the steering angle θh1 (Step S190), and outputs the limited result as the steering angle θh2 to the correcting section 933. The correcting section 933 obtains the target turning angle θtref by correcting the steering angle θh2 (Step S200), and outputs it to the turning angle control section 920.

The turning angle control section 920 inputting the turning angle θt and the target turning angle θtref, calculates a deviation $\Delta\theta t_0$ by subtracting the turning angle θt from the target turning angle θtref at the subtracting section 927 (Step S210). The deviation $\Delta\theta t_0$ is inputted into the turning angle FB compensating section 921. The turning angle FB compensating section 921 compensates the deviation $\Delta\theta t_0$ by multiplying the deviation $\Delta\theta t_0$ by a compensation value (Step S220), and outputs a target turning angular velocity ωtref to the velocity control section 923. The turning angular velocity calculating section 922 inputs the turning angle θt, calculates a turning angular velocity ωtt by differential calculation to the turning angle θt (Step S230), and outputs it to the velocity control section 923. The velocity control section 923 calculates a motor current command value Imcta by I-P control as with the velocity control section 150 (Step S240), and outputs it to the output limiting section 926. The output limiting section 926 limits the upper and lower limit values of the motor current command value Imcta by the preset upper limit value and lower limit value (Step S250), and outputs the limited result as the motor current command value Imct (Step S260).

The motor current command value Imct is inputted into the current control section 930. The current control section 930 performs the current control by driving the driving motor 71 on the basis of the motor current command value Imct and the current value Imd of the driving motor 71 detected by the motor current detector 940 (Step S270).

Figure 22:
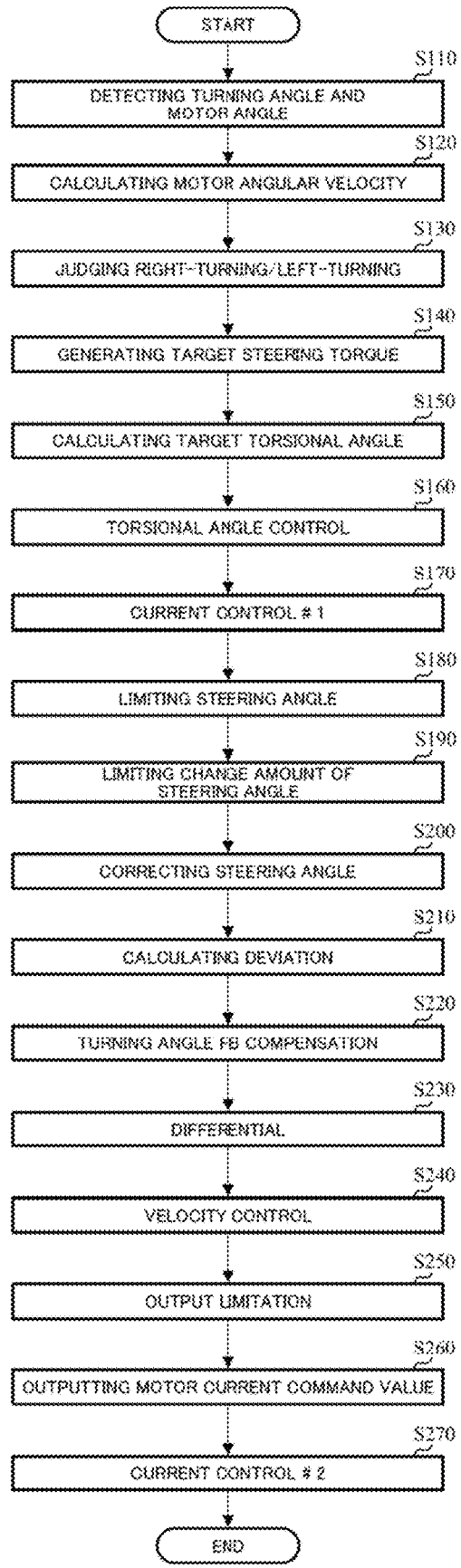
FIG. 22 is a flowchart showing an operating example (the third embodiment) of the present invention.

Each order of the data inputs, the calculations and so on in FIG. 22 is appropriately changeable. The velocity control section 923 in the turning angle control section 920 may use control that is realizable and includes any of P, I and D control, such as PI control, P control, PID control, PI-D control or the like, instead of I-P control, as with the velocity control section 150 in the torsional angle control section 140. Following control in the turning angle control section 920 and the torsional angle control section 140 may be performed with a control structure generally used.

Although one ECU controls the reaction force apparatus 60 and the driving apparatus 70 as shown in FIG. 18 in the third embodiment, it is possible to provide an ECU for the reaction force apparatus 60 and an ECU for the driving apparatus 70 respectively. In this case, the ECUs transmit and receive data with each other by communication. Although the SBW system shown in FIG. 18 does not have a mechanical connection between the reaction force apparatus 60 and the driving apparatus 70, the present invention can be applied also to an SBW system that comprises a mechanical torque transmission mechanism which mechanically connects the column shaft 2 with a turning mechanism by using a clutch or the like when an abnormality occurs in the system. Such an SBW system makes the mechanical torque transmission open by turning off the clutch when the system is normal, and makes the mechanical torque transmission possible by turning on the clutch when the system is abnormal.

Although the torsional angle control section 140 in the above first to third embodiments and the assist control section 200 in the second embodiment directly calculate the motor current command value Imc and the assist current command value Iac, it is possible to calculate a motor torque (a target torque) to be outputted before calculating them, and then calculate the motor current command value and the assist current command value. In this case, a relation between a motor current and a motor torque, which is generally used, is used to obtain the motor current command value and the assist current command value by the motor torque.

The drawings used above are conceptual diagrams to describe the present invention qualitatively, and are not limited to. The above embodiments are preferred embodiments of the present invention, but are not limited to, and are variously deformable without departing from the summary of the present invention. The torsion bar may not be limited to if the substitute is a mechanism having an arbitrary spring constant between a steering wheel and a motor or a reaction motor.

A main object of the present invention relates to a realizing means by the steering angle disturbance compensation to solve the problem that the followability of the torsional angle to the target torsional angle is likely to get worse in the case that a rapid change of the steering angle occurs, such as in abrupt steering. With respect to a realizing means of the followability of the steering torque to the target steering torque, the above may not be limited to.

EXPLANATION OF REFERENCE NUMERALS

1 steering wheel
2 column shaft (steering shaft, handle shaft)
2A torsion bar
3 reduction mechanism
10 torque sensor
12 vehicle speed sensor
14 steering angle sensor
20 motor
30, 50 control unit (ECU)
31 current command value calculating section
33, 270 current limiting section
34 compensation signal generating section
38, 170, 940 motor current detector
60 reaction force apparatus
61 reaction motor
70 driving apparatus
71 driving motor
72 gear
73, 74 angle sensor
100 EPS steering system/vehicle system
110 right-turning/left-turning judging section
120 target steering torque generating section
121 basic map section
123 damper gain section
124 hysteresis correcting section
128 phase compensating section
130 converting section
140 torsional angle control section
141 torsional angle feedback (FB) compensating section
142 torsional angular velocity calculating section
143 stabilization compensating section
144 steering angle disturbance compensating section
145, 926 output limiting section
150, 923 velocity control section
160, 930 current control section
200 assist control section
910 target turning angle generating section
920 turning angle control section
921 turning angle feedback (FB) compensating section
922 turning angular velocity calculating section
931 limiting section
932 rate limiting section
933 correcting section
951 angular velocity calculating section

The invention claimed is:

1. A steering apparatus for vehicles that comprises at least a torsion bar having an arbitrary spring constant, a sensor for detecting a torsional angle of said torsion bar, and a sensor for detecting a steering angle of a steering wheel, drives and controls a motor, and assists and controls a steering system, comprising a processor configured to:
calculate a motor current command value to make said torsional angle follow a target torsional angle by:
calculating a first compensation motor current command value by performing a secondary filter processing and a multiplication of a gain to said detected steering angle,
calculating a second compensation motor current command value by setting a transfer function being necessary for stabilization of a motor angular velocity,
calculating a target torsional angular velocity by a deviation between said target torsional angle and said torsional angle,
calculating a torsional angular velocity by said torsional angle, and
calculating a basic motor current command value based on said target torsional angular velocity and said torsional angular velocity, and
outputting said motor current command value by limiting an upper limit value and a lower limit value of a current obtained by compensating said basic motor current command value with said first compensation motor current command value and said second compensation motor current command value, wherein said steering apparatus for vehicles drives and controls said motor based on said motor current command value.

2. The steering apparatus for vehicles according to claim 1, wherein said processor is further configured to:

generate a target steering torque; and convert said target steering torque into said target torsional angle.

3. The steering apparatus for vehicles according to claim 2, wherein to generate said target steering torque, said processor is further configured to:

obtain a first torque signal in accordance with said steering angle and a vehicle speed by using a basic map being vehicle speed sensitive, obtain a second torque signal based on angular velocity information by using a damper gain map being vehicle speed sensitive, and obtain a third torque signal by performing hysteresis correction by using a steering state and said steering angle, and calculate said target steering torque by at least one of said first torque signal, said second torque signal, or said third torque signal.

4. The steering apparatus for vehicles according to claim 2, wherein to generate said target steering torque, said processor is further configured to:

perform phase compensation, and obtain said first torque signal in accordance with said steering angle and said vehicle speed.

* * * * *